under said partitions, a tank mounted

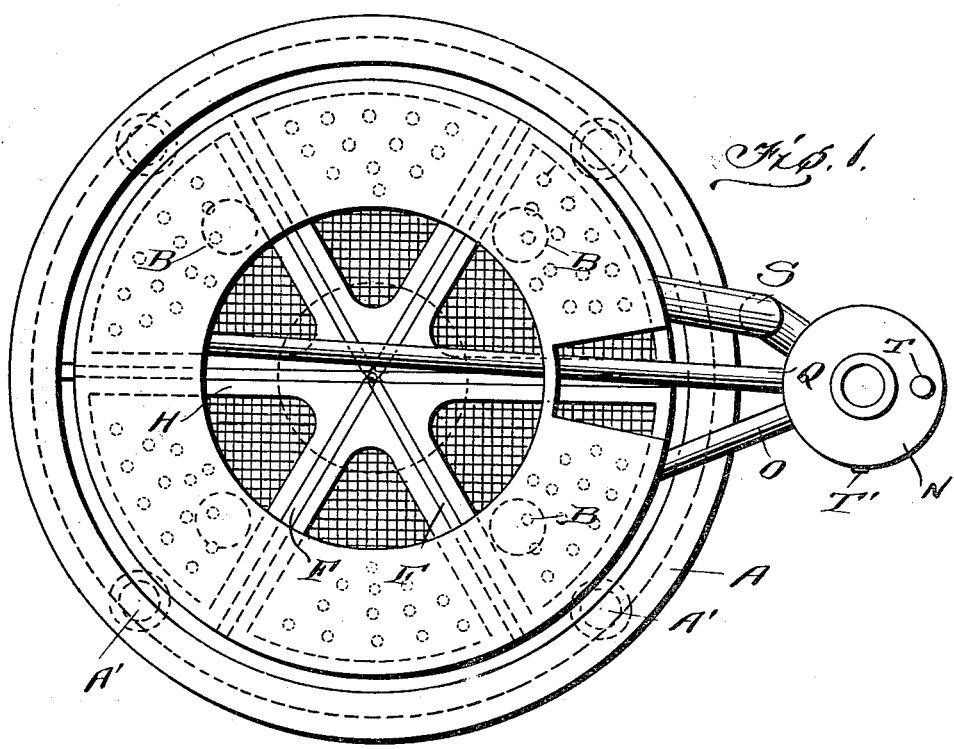
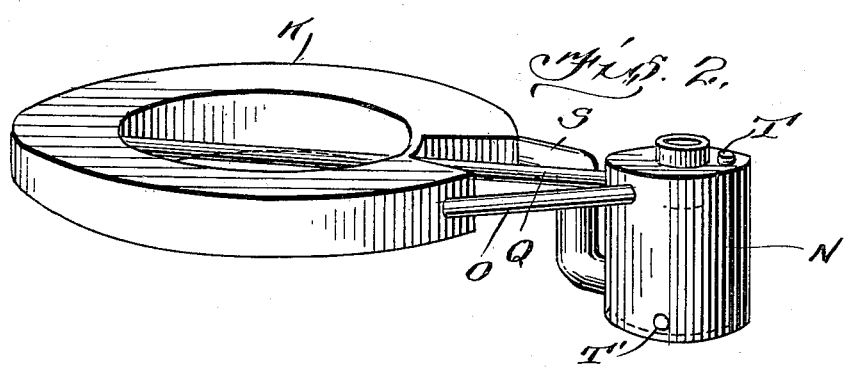

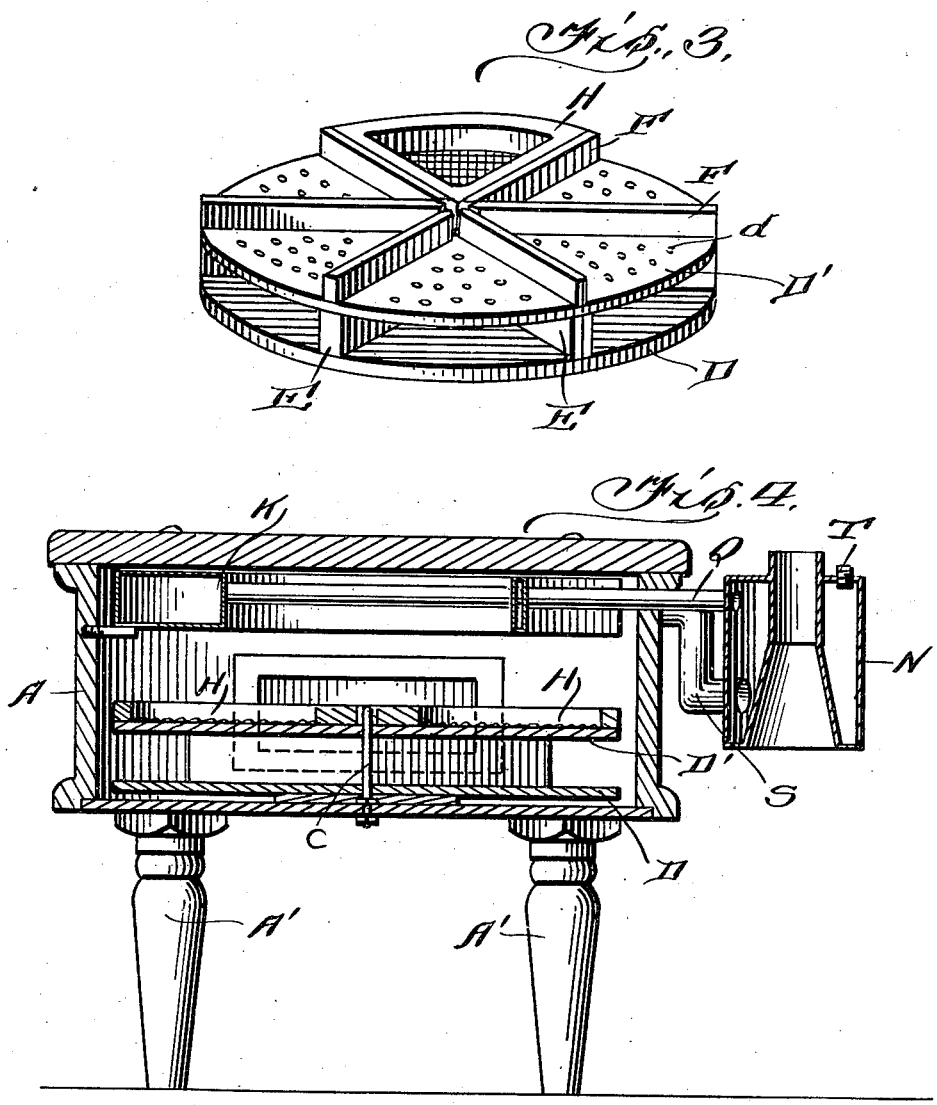

UNITED STATES PATENT OFFICE.

CHARLES A. MILTON, OF KOKOMO, INDIANA.

INCUBATOR.

1,009,086.   Specification of Letters Patent.   Patented Nov. 21, 1911.

Application filed January 13, 1911. Serial No. 602,449.

*To all whom it may concern:*

Be it known that I, CHARLES A. MILTON, a citizen of the United States, residing at Kokomo, in the county of Howard and State of Indiana, have invented certain new and useful Improvements in Incubators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in incubators and the object in view is to produce a simple and efficient apparatus of this nature which is preferably cylindrical and double walled and provided with a rotatable double disk tray-holding rack, access to which may be had through a circumferential door in the casing.

Another feature of the invention consists of a cylindrical heating tank having communication with an outside boiler, direct means being provided for supplying additional heat to the interior tank from the boiler.

The invention comprises various details of construction and combinations and arrangements of parts which will be hereinafter fully described and then specifically defined in the appended claim.

I illustrate my invention in the accompanying drawings, in which:—

Figure 1 is a top plan view of the incubator with the cover removed. Fig. 2 is a perspective view of the heating apparatus. Fig. 3 is a perspective view of the disk rack, and Fig. 4 is a vertical sectional view.

Reference now being had to the details of the drawings by letter, A designates the casing of the incubator which is cylindrical in form and supported in the present instance upon legs A' and is provided with a suitable door opening $a$. The bottom of the casing is provided with a plurality of openings B and has a central pivotal pin C upon which the double disk rack is mounted. Said rack is made up of two disks D and D', the former of which is imperforate with the exception of the central pivotal hole which is mounted upon said pivotal pin and the upper disk is provided with perforations $d$. Radial partitions E are disposed between the two disks of the rack, forming a series of angular compartments, and radially disposed ribs F rise from the upper surface of the perforated disk with a space F' intermediate their inner tapering ends into which the pivotal pin projects. Trays, designated by letter H, are adapted to be mounted between the various radially disposed partitions upon the disk rack and are adapted to contain the eggs to be hatched.

A heating tank K is provided which is circular in outline, and N is a boiler which is adapted to contain the water to be heated by means of a lamp and is positioned outside the casing. A pipe O communicates between the boiler B and with the tank K and a second pipe, designated by letter Q, has a direct communication between the boiler and the tank substantially at its longitudinal central portion in order to supply heat to it at the adjacent portions of the tank. Said additional pipe Q is provided as an auxiliary supply of hot water to the tank in the event of water entering through the pipe O becoming cooled before making its circuit through the tank. By this means a uniform temperature may be maintained within the tank. A pipe S communicates with the boiler at one end and its other end with the tank, preferably at the end opposite from that with which the pipe O communicates, thus affording means of circulation of the water from the boiler to and through the tank and return. Said boiler is provided with a suitable filling opening T and also an exit opening T' whereby the contents of the boiler may be emptied.

By the provision of an incubator embodying the features of my invention, it will be noted that a simple and efficient means is provided whereby the various trays containing the eggs may be brought opposite the opening by the rotation of the rack carrying the same, a uniform temperature may be maintained and a draft of fresh air caused to be drawn up through the apparatus in the bottom of the casing, the openings through which the pipes lead in the casing serving as a means for ventilating purposes.

What I claim to be new is:—

An incubator comprising a casing, disks rotatably mounted within said casing, radial partitions between the disks, radially disposed ribs mounted upon the upper disk which is perforated, the inner ends of said ribs being spaced apart, trays conforming to the space intermediate said ribs and each having its apex projecting into said space at the inner ends of the ribs, a circular outlined tank mounted in the upper portion of the casing and having a hollow central portion over said trays, a heating tank outside the casing and communicating with the tank within the casing.

In testimony whereof I hereunto affix my signature in the presence of two witnesses.

CHARLES A. MILTON.

Witnesses:
A. G. MANNING,
J. L. OVERSON.

Copies of this patent may be obtained for five cents each, by addressing the "Commissioner of Patents, Washington, D. C."